| United States Patent [19] | [11] Patent Number: 4,497,287 |
| --- | --- |
| Schleiermacher et al. | [45] Date of Patent: Feb. 5, 1985 |

[54] INTAKE SYSTEM WITH OSCILLATOR TUBES

[75] Inventors: Herbert Schleiermacher, Brühl; Lothar Bauer, Cologne, both of Fed. Rep. of Germany

[73] Assignee: Klöckner-Humboldt-Deutz Aktiengesellschaft, Cologne, Fed. Rep. of Germany

[21] Appl. No.: 377,815

[22] Filed: May 13, 1982

[30] Foreign Application Priority Data

May 14, 1981 [DE] Fed. Rep. of Germany ....... 3119190

[51] Int. Cl.³ ............................................. F02M 35/10
[52] U.S. Cl. ............................ 123/52 MC; 123/52 M; 123/198 E; 181/240
[58] Field of Search ......... 123/52 M, 52 MB, 52 ML, 123/52 MC, 198 E; 181/229, 214, 240, 204

[56] References Cited

U.S. PATENT DOCUMENTS

| 3,835,956 | 9/1974 | Kishira | 181/229 |
| 4,011,849 | 3/1977 | Latham | 123/198 E |
| 4,017,459 | 4/1977 | Onder | 260/47 CP |
| 4,175,504 | 11/1979 | Ederer et al. | 123/52 M |
| 4,183,332 | 1/1980 | Hofbaüer et al. | 123/52 M |
| 4,235,303 | 11/1980 | Dhoore et al. | 181/214 |
| 4,341,186 | 7/1982 | Mayr et al. | 123/52 M |

Primary Examiner—Craig R. Feinberg
Assistant Examiner—David A. Okonsky
Attorney, Agent, or Firm—Becker & Becker, Inc.

[57] ABSTRACT

The spatially curved oscillator tubes are closely seated on the cylinder head and are partially integrated in that wall of a common intake housing which faces the cylinder head, and are completed by shell halves. The intake system preferably includes injection molded synthetic material, and is fastened on the cylinder head by an aluminum fastening rail or strip, or includes reinforced synthetic material, and is fastened directly on the cylinder head. An air-filter element can be installed as a part of the intake housing.

22 Claims, 6 Drawing Figures

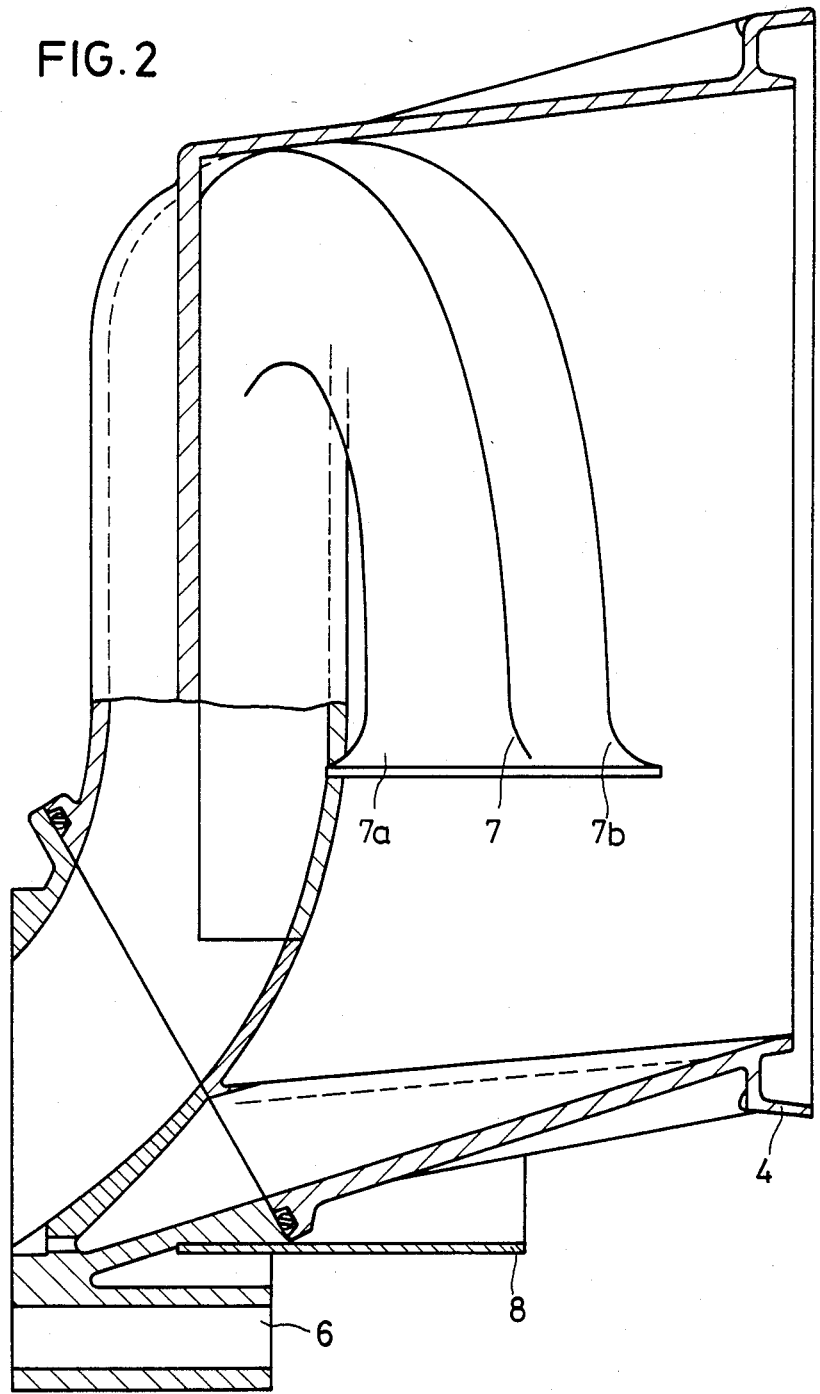

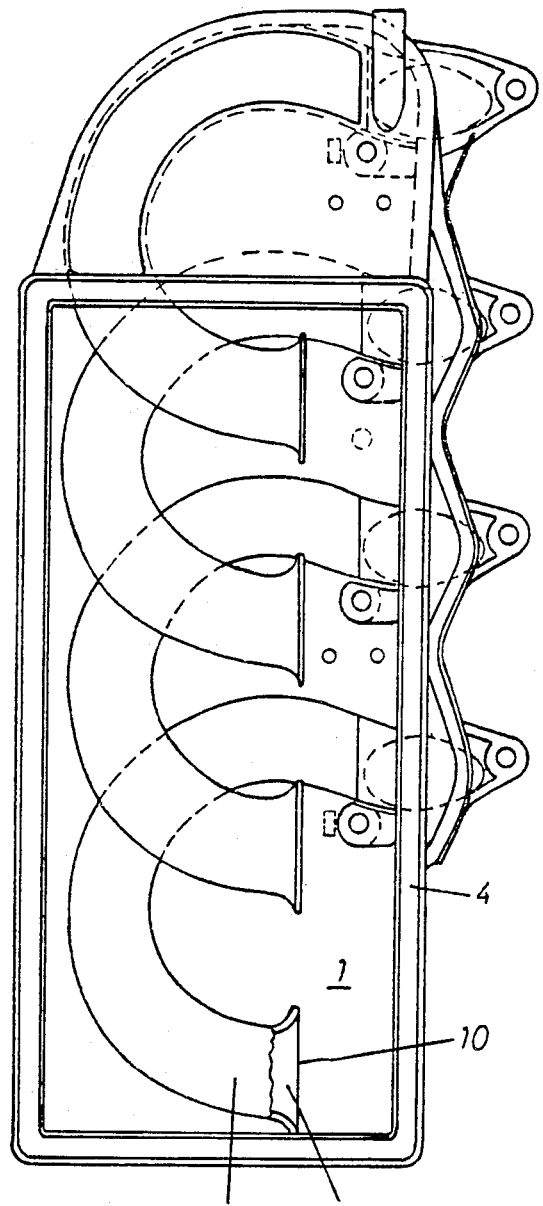

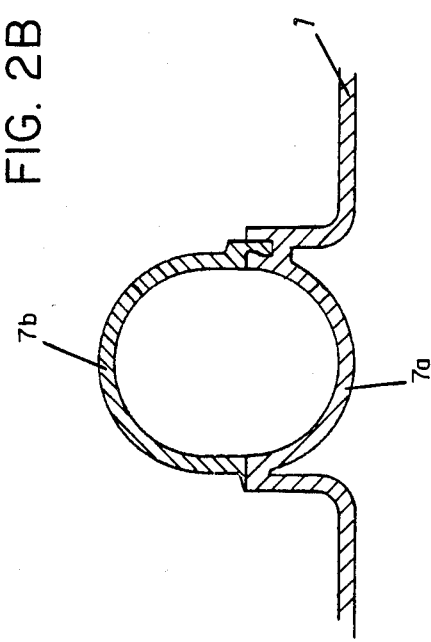

INTAKE SYSTEM WITH OSCILLATOR TUBES

The present invention relates to an intake system for multicylinder internal combustion engines, especially fuel injection engines. The system has curved intake oscillator tubes, the intake funnels of which open in a common intake housing or manifold.

The known intake systems, as for instance described in German Offenlegungsschrift No. 24 03 090 and German Offenlegungsschrift No. 25 25 769, are extremely bulky and require too much space for modern vehicle concepts.

Although the intake system described in German Offenlegnugsschrift No. 24 03 090 already had curved intake tubes, these tubes are only curved in one plane, and the entire system projects away from the cylinder head rather than conforming thereto, and consequently requires too much space.

The installation dimensions of an internal combustion engine are likewise considerably increased by an oscillator tube system according to German Offenlegungsschrift No. 25 25 769, since such a system is mounted on the end of the engine, and the supercharger or blower into which the oscillator tubes open is very bulky in order to accommodate the optimum tube lengths.

It is therefore an object of the present invention to provide an intake system which, in conformity with the requirements of modern vehicle construction, is light weight and saves space, and which additionally is economical to produce and which extensively prevents any noise.

This object, and other objects and advantages of the present invention, will appear more clearly from the following specification in connection with the accompanying drawings, in which:

FIGS. 2, 2A and 2B are sections taken through one embodiment of the suction system with a fastening rail or strip;

Figure 1:
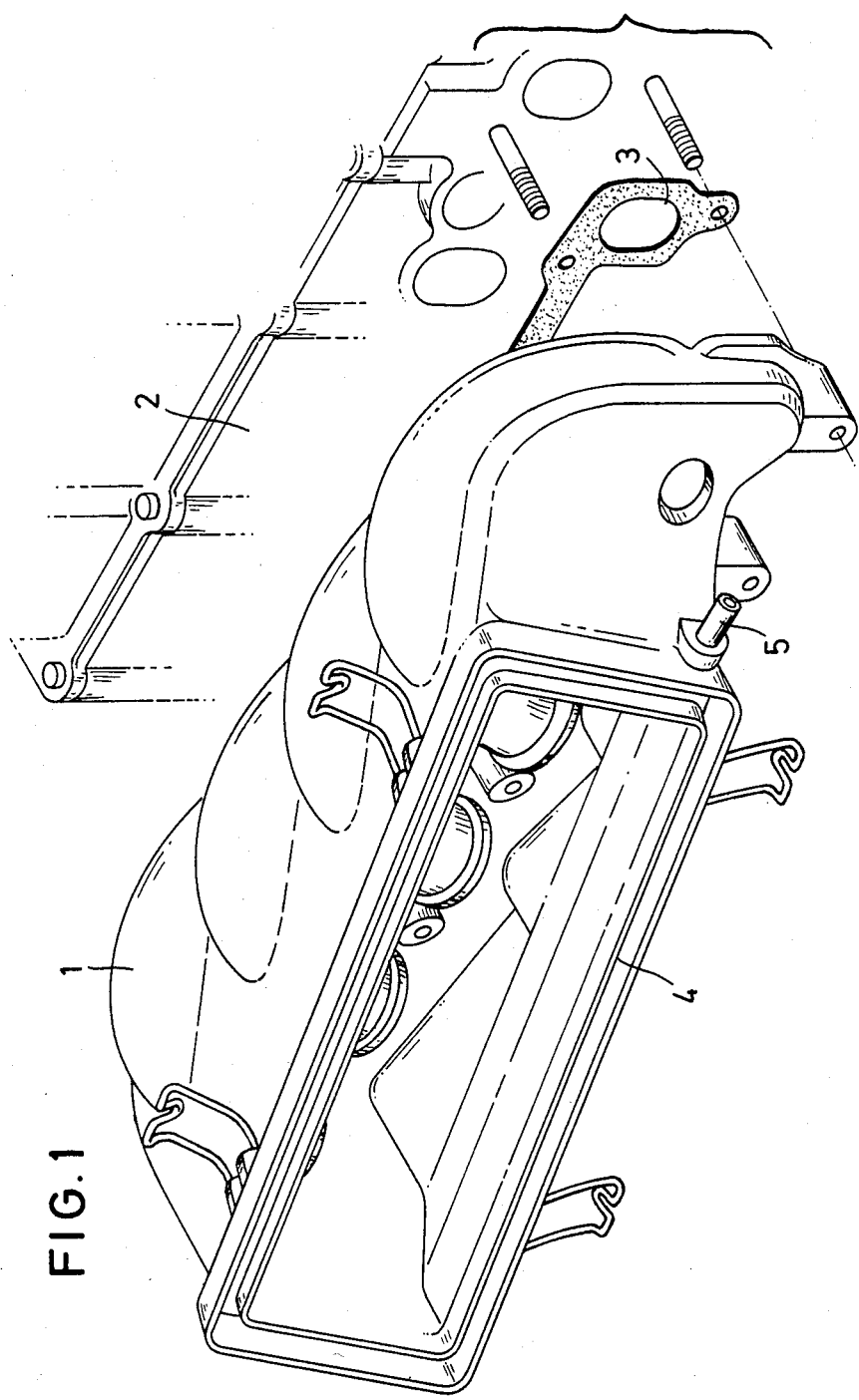
FIG. 1 is a perspective view of one embodiment of the intake system of the present invention.
Figure 3:
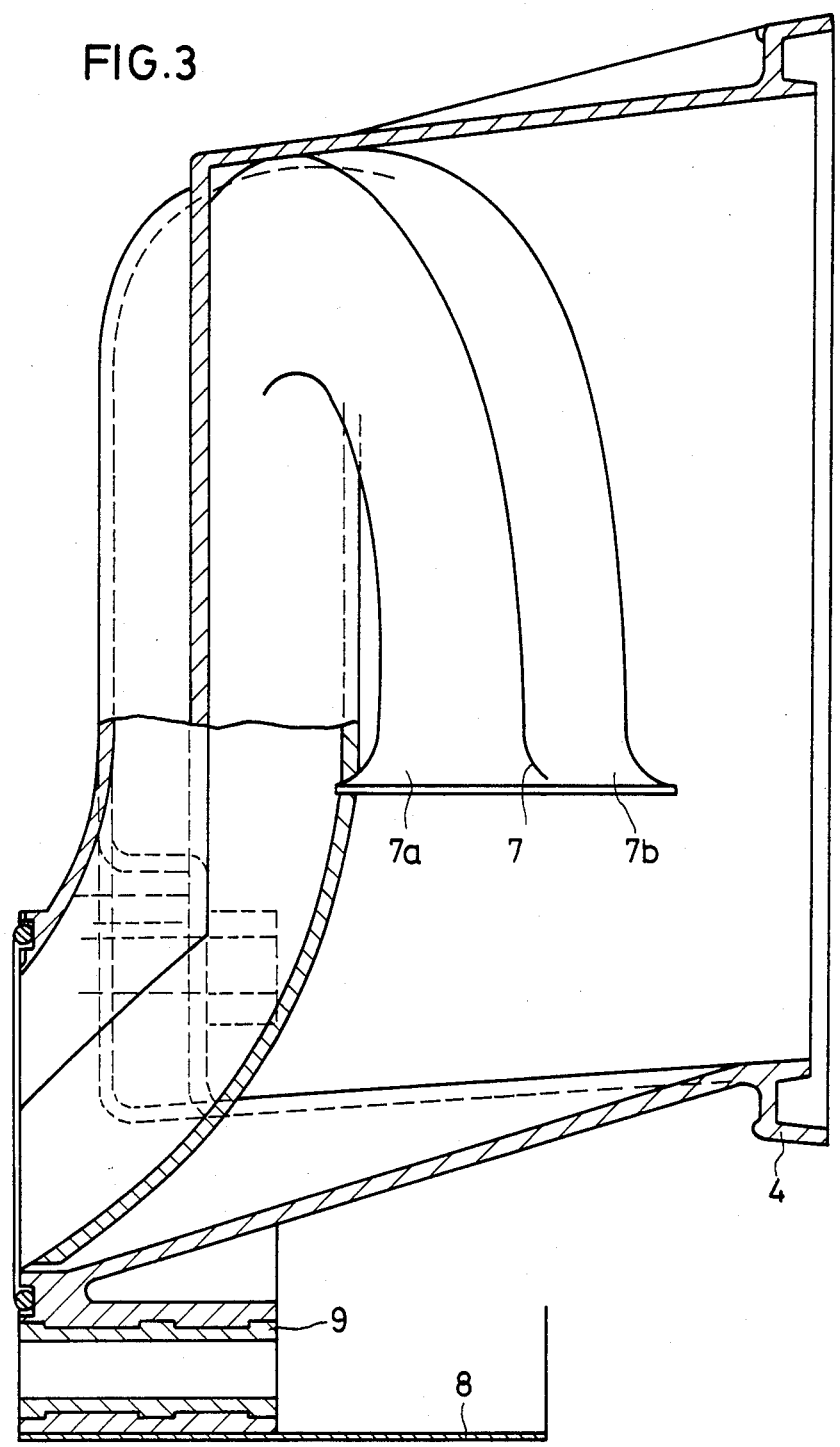
FIG. 3 is a section through an embodiment of the intake system without the fastening rail or strip.
Figure 4:
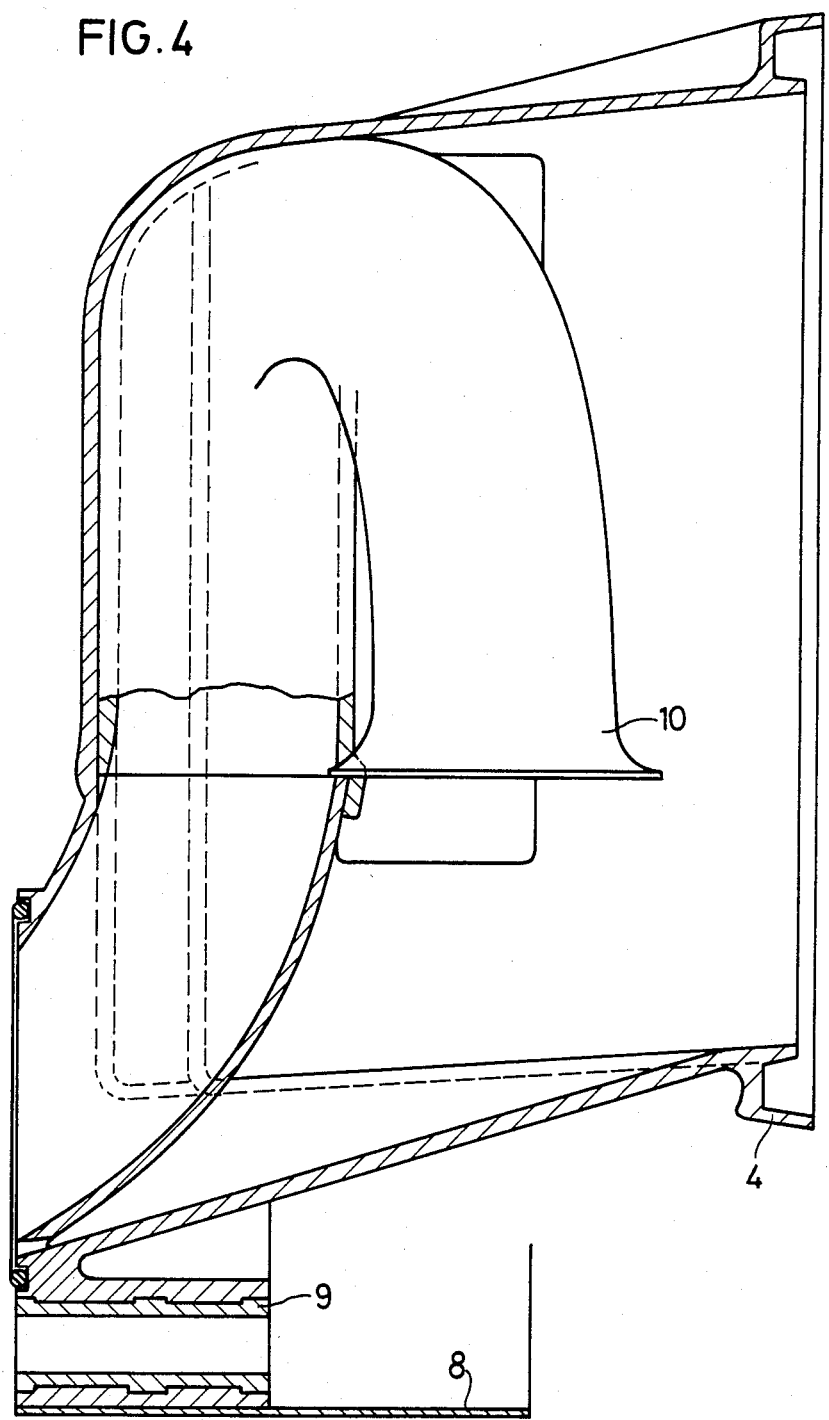
FIG. 4 is a section through another embodiment of the system without fastening rail or strip and with integral or onepiece pressure-gas tubes.

The intake system of the present invention is characterized primarily in that the swing or oscillator tubes are curved in more than one plane, and are seated closely on the cylinder head.

The oscillator tubes are curved in several planes in order to obtain the optimum lengths. The tubes are arranged in such a way that they are closely seated on the cylinder head, and that their intake funnels open in a common intake housing or manifold. Consequently, the requirements for a supercharging effect can be fulfilled by resonance oscillations. To save cost and weight, the intake system, and in particular the intake housing and the oscillator tubes, are expediently made as an aluminum casting, or are injection molded of synthetic material.

According to a further embodiment of the present invention, the oscillator tubes comprise several shell halves, one of which is partially a component of that wall of the intake housing or manifold which faces the cylinder head, while the other half is placed on as a shell and is secured by means of a bolt and/or snap connection. At the intersections of the oscillation tubes, the adjoining shell halves of the intersecting tubes are combined into a single structural part. Material, and thus weight, can be saved as a result of this construction of the intake system. Additionally, the production costs are advantageously influenced, since only a few different parts need to be produced, which are assembled according to the mechanical technique (MAT).

If the joint faces or interfaces of the tube halves lie in the direction of flow, and if joints or abutting areas of the oscillator tubes and extending transverse to the flow are constructed in such a way that the inner contour of the tube of the preceding tube part is always smaller than that of the subsequent part, there is assured that the flow in the tube is not hindered. The oscillator tubes are sealed-off by die-cast or extruded on sealing lips and/or folded down edges. The separating lines or plane of separation need not be 100% tight or sealed, since they are within the intake housing.

An aluminum fastening rail or strip is provided between the synthetic material intake housing or manifold, and the cylinder head in a further embodiment or modification of the present invention; this aluminum fastening rail is centrally connected with the intake housing by a bolt with a centering sleeve, and is connected laterally by elastic joint fastenings. The different heat expansions of the aluminum rail and the synthetic material housing are taken up or absorbed by the synthetic material joints. Providing a gap between the aluminum strip or rail and the synthetic material housing prevents a heat flow which is too great from the aluminum rail into the synthetic material housing, and assures that the different heat expansion remains small.

According to a further development of the concept of the present invention, the intake housing can also comprise reinforced synthetic material, for instance glass-fiber-reinforced polyamide, and can be fastened directly on the cylinder head, i.e., without the interposition of the fastening rail or strip. No direct contact exists between the intake housing and the cylinder head. The intake housing is supported on the cylinder head by the screw or bolt support or insulator sleeves. The gap prevents heat flow into the housing.

A thermal radiation shield is expediently provided for protection against overheating of the synthetic material parts. This shield keeps the heat radiated from the cylinder head and crankcase away from the intake system.

A further advantage exists when one side of the intake housing, preferably the side remote from the cylinder head, is constructed in such a way that an air-filter element can be mounted directly, i.e., without requiring any further fastening on other engine parts, and without the interposition of a hose connection. The side of the intake housing remote from the cylinder head can, according to one embodiment, comprise an open frame which is suitable for receiving a plate air-filter.

A further advantage of the intake system according to the present invention is that an initial whirl or twist results from the expedient spatial curvature of the oscillator tubes. This initial whirl enhances the twist of the intake charge in the combustion chamber necessary for an internal combustion engine having direct fuel injection.

The oscillator tubes may be embodied in one piece, and may be fastened to the intake housing by means of stud snaps, stud rivets, or bolts.

The housing may be provided externally and/or internally with ribs which are arranged perpendicularly and/or at an angle on the surface. The hollow spaces between the ribs are filled with sound-damping material.

The housing may also be a sandwich construction, with sound-damping material provided between the outer and inner shells.

The housing may also be a sandwich construction whereby the outer and inner shells are connected with each other by webs.

Referring now to the drawings in detail, the complete suction or intake housing or manifold 1, with the swing or oscillator tubes 7a, 7b, 7, 10, is screwed or bolted to the cylinder head 2. A heat insulating seal or gasket 3 is used as an intermediate layer to reduce the heat conduction from the cylinder head 2 into the fastening rail or strip 6 or into the housing 1. A frame 4 is provided for the connection of an air-filter element, and a connection 5 is provided for the crankcase ventilation line.

FIGS. 2, 2A and 2B illustrate how a fastening rail or strip 6 can be constructed. The separating seam 7 between the shell halves 7a, 7b is clearly recognizable. The heat or thermal radiation shield 8 is attached, in these embodiments, in such a way that it keeps the heat which radiates from the exhaust manifold and pipes away from the synthetic material parts of the intake system. In the embodiments which have no fastening rail, a sleeve 9 is pressed or cast into the synthetic material part as an insert or separator for the screws or bolts.

The present invention is, of course, in no way restricted to the specific disclosure of the specification and drawings, but also encompasses any modifications within the scope of the appended claims.

What we claim is:

1. A multi-part intake system having a flow direction of suctioned intake combustion air for multi-cylinder internal combustion engines which include a cylinder head for said cylinders, said intake system comprising:
   an intake housing including a cylinder-head side as well as having an inside and having an intake housing wall as well as inside and outside surfaces; and
   intake oscillator tubes which are curved in more than one plane and which extend inside said intake housing as well as along said intake housing wall toward the cylinder head, said oscillator tubes each being connected with said intake housing in common and the cylinder head as well as respectively having a first end and a second end, with said first end of each oscillator tube being provided with an intake funnel which opens into said common intake housing, and with the second end of each oscillator tube being seated closely on said cylinder head, said intake oscillator tubes at least for a portion thereof consisting of adjoining shell halves having abutting surfaces formed along a single plane thereof lying in flow direction of suctioned intake combustion air with the shell halves being connected with each other, wherein said intake oscillator tubes cross each other inside the common intake housing, said adjoining shell halves crossing each other at the tube crossings which lie substantially in a single plane perpendicular to said plane of said abutting surfaces being unified into one structural part, said intake housing wall on the cylinder-head side being constructed as a shell half.

2. An intake system according to claim 1, in which said oscillator tubes respectively comprise two shell halves, one of which partially forms that portion of said intake housing which faces said cylinder head, and the other of which is placed thereon as a complementary shell and is secured by snap or screw connection rigidly therewith.

3. An intake system according to claim 1, in which said intake housing is a sandwich construction comprising an inner and outer shell having sound-damping material therebetween.

4. An intake system according to claim 1, in which said intake housing is a sandwich construction comprising an inner and outer shell connected with each other by webs.

5. An intake system according to claim 1, in which said intake housing comprises a reinforced synthetic material part and is fastened directly on said cylinder head.

6. An intake system according to claim 5, in which said reinforced synthetic material part comprises glass-fiber-reinforced polyamide.

7. An intake system according to claim 1, in which one portion of said intake housing is constructed to receive an air-filter element therewith.

8. An intake system according to claim 7, in which a portion of said intake housing remote from said cylinder head comprises an open frame for receiving a plate air-filter relative thereto.

9. An intake system according to claim 1, in which ribs are provided with at least one of inside and outside surfaces of said intake housing.

10. An intake system according to claim 9, in which spaces located between said ribs are filled with sound-damping material.

11. An intake system according to claim 1, in which said intake housing and said oscillator tubes are injection molded synthetic material parts including sealing surfaces.

12. An intake system according to claim 11, which includes extruded sealing lips for sealing off said sealing surfaces of said oscillator tubes.

13. An intake system according to claim 11, which includes a thermal radiation shield arranged for protection against overheating of said synthetic material parts.

14. An intake system according to claim 13, which includes an aluminum fastening rail between said intake housing and said cylinder head, a central portion of said fastening rail being connected to said intake housing by means of a bolt with a centering sleeve, and elastic joint fastenings connecting said rail laterally to said housing.

15. An intake system according to claim 14, which includes a gap between said aluminum fastening rail and said intake housing as the synthetic material part.

16. An intake system for a multi-cylinder internal combustion engine which has a cylinder head for the cylinders, said intake system comprising:
   an intake housing which is fastened to the cylinder head;
   intake oscillator tubes which are arranged inside the intake housing;
   said intake oscillator tubes having two ends, whereby respectively one end of the intake oscillator tube has an intake funnel inside the intake housing and the second end of the intake oscillator tube is connected with the cylinder head;
   said intake oscillator tubes extending at least in a partial range thereof along the intake housing wall toward the cylinder head and said intake oscillator tubes being curved in more than one plane at least in this region;
   said intake oscillator tubes at least in a part extending in the region along the cylinder head side consisting of two adjoining shell halves; said shell halves having separating surfaces formed along a single plane located in flow direction of the suctioned combustion air, wherein said intake oscillator tubes cross each other inside the common intake housing, said adjoining shell halves crossing each other at the tube crossings which lie substantially in a single plane perpendicular to said plane of said separating surfaces being unified into one structural part, said two shell halves having fastening means for connection with each other; and said intake housing wall toward the cylinder head side being constructed as one shell half of said intake oscillator tubes.

17. An intake system according to claim 16, wherein said intake housing and said intake oscillator tubes consist of injection molded synthetic material; and a heat-radiation shield provided therewith for protection against overheating of the synthetic material parts.

18. An intake system according to claim 16, wherein the separating surfaces of the shell halves of the intake oscillator tubes are sealed by injected sealing lips.

19. An intake system according to claim 16, wherein said common intake housing is fastened directly to the cylinder head of the internal combustion engine.

20. An intake system according to claim 19, wherein the housing has ribs provided therewith on the surface thereof.

21. An intake system according to claim 19, wherein a side of the intake housing away from the cylinder head is so constructed that an air filter element is directly attachable therewith.

22. An intake system according to claim 21, wherein the side of the intake housing away fron the cylinder head consists only of an open frame which is adapted for receiving a plate air filter.

* * * * *